(12) United States Patent
Bertz et al.

(10) Patent No.: US 10,237,796 B1
(45) Date of Patent: *Mar. 19, 2019

(54) PACKET GATEWAY REASSIGNMENT

(71) Applicant: Spring Spectrum L.P., Overland Park, KS (US)

(72) Inventors: Lyle T. Bertz, Lee's Summit, MO (US); Mark R. Bales, Lee's Summit, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/899,005

(22) Filed: Feb. 19, 2018

Related U.S. Application Data

(63) Continuation of application No. 15/062,915, filed on Mar. 7, 2016, now Pat. No. 9,936,430.

(51) Int. Cl.
*H04W 4/00* (2018.01)
*H04W 36/12* (2009.01)
*H04L 29/12* (2006.01)

(52) U.S. Cl.
CPC ......... *H04W 36/12* (2013.01); *H04L 61/1511* (2013.01)

(58) Field of Classification Search
CPC . H04W 36/12; H04W 36/0011; H04W 76/12; H04W 76/22; H04W 76/25
See application file for complete search history.

(56) References Cited

U.S. PATENT DOCUMENTS

| | | |
|---|---|---|
| 6,230,012 B1 | 5/2001 | Willkie et al. |
| 6,697,354 B1 | 2/2004 | Borella et al. |
| 6,708,219 B1 | 3/2004 | Borella et al. |
| 6,711,159 B1 | 3/2004 | Grabelsky et al. |
| 6,731,642 B1 | 5/2004 | Borella et al. |
| 6,768,743 B1 | 7/2004 | Borella et al. |
| 6,781,982 B1 | 8/2004 | Borella et al. |
| 6,816,912 B1 | 11/2004 | Borella et al. |
| 6,956,846 B2 | 10/2005 | Lewis et al. |

(Continued)

OTHER PUBLICATIONS

3rd Generation Partnership Project 2 "3GPP2," Interoperability Specification (IOS) for cdma2000 Access Network Interfaces—Part 1 Overview (3G-10S v5.0.4), Mar. 2014, 28 pages.

(Continued)

*Primary Examiner* — Abdelnabi O Musa

(57) ABSTRACT

An example embodiment may involve receiving an attach request related to a WCD. It may be determined that the WCD already has an established bearer session with a first PGW device. Possibly in response to receiving the attach request from the WCD and the WCD already having the established bearer session with the first PGW device, a request for PGW device assignment may be transmitted to a server device. A response from the server device may be received, where the response may indicate assignment of a second PGW device. A create session request may be transmitted to an SGW device. Reception of the create session request may cause the SGW device to establish, for the WCD, a new bearer session to the second PGW device. Establishment of the new bearer session may involve the second PGW device retrieving, from the first PGW device, context information related to the WCD.

17 Claims, 6 Drawing Sheets

(56) References Cited

U.S. PATENT DOCUMENTS

| | | | |
|---|---|---|---|
| 6,973,309 | B1 | 12/2005 | Rygula et al. |
| 6,993,039 | B2 | 1/2006 | Borella |
| 6,996,621 | B1 | 2/2006 | Borella et al. |
| 7,031,275 | B1 | 4/2006 | Borella et al. |
| 7,080,151 | B1 | 7/2006 | Borella et al. |
| 7,154,868 | B1 | 12/2006 | Sharma et al. |
| 7,158,492 | B2 | 1/2007 | Haverinen |
| 7,193,985 | B1 | 3/2007 | Lewis et al. |
| 7,218,609 | B2 | 5/2007 | Borella et al. |
| 7,280,546 | B1 | 10/2007 | Sharma et al. |
| 7,286,512 | B1 | 10/2007 | Borella |
| 7,295,511 | B2 | 11/2007 | Sharma et al. |
| 7,305,429 | B2 | 12/2007 | Borella |
| 7,324,499 | B1 | 1/2008 | Borella et al. |
| 7,346,684 | B2 | 3/2008 | Borella |
| 7,366,509 | B2 | 4/2008 | Akgun et al. |
| 7,457,289 | B2 | 11/2008 | Wang |
| 7,505,432 | B2 | 3/2009 | Leung et al. |
| 7,733,904 | B1 | 6/2010 | Borella et al. |
| 7,778,220 | B2 | 8/2010 | Sastry |
| 7,813,316 | B2 | 10/2010 | Sastry |
| 8,107,496 | B2 | 1/2012 | Borella et al. |
| 8,341,295 | B1 | 12/2012 | Liu et al. |
| 8,396,076 | B2 | 3/2013 | Borella et al. |
| 8,411,858 | B2 | 4/2013 | Muhanna et al. |
| 8,422,467 | B2 | 4/2013 | Wang et al. |
| 8,437,305 | B2 | 5/2013 | Cheever et al. |
| 9,277,579 | B1 | 3/2016 | Zhao et al. |
| 9,350,604 | B1 | 5/2016 | Xue et al. |
| 9,445,256 | B1 | 9/2016 | Cole et al. |
| 2003/0208601 | A1 | 11/2003 | Campbell et al. |
| 2004/0095943 | A1 | 5/2004 | Korotin |
| 2005/0047420 | A1 | 3/2005 | Tanabe et al. |
| 2006/0002356 | A1 | 1/2006 | Barany et al. |
| 2006/0059551 | A1 | 3/2006 | Borella |
| 2006/0104214 | A1 | 5/2006 | Borella |
| 2006/0149814 | A1 | 7/2006 | Borella |
| 2006/0159042 | A1 | 7/2006 | Borella |
| 2006/0171365 | A1 | 8/2006 | Borella |
| 2007/0171886 | A1 | 7/2007 | Lewis et al. |
| 2009/0285183 | A1 | 11/2009 | Wu et al. |
| 2010/0020747 | A1 | 1/2010 | Xia et al. |
| 2010/0202351 | A1 | 8/2010 | Xi et al. |
| 2010/0278108 | A1* | 11/2010 | Cho ............... H04W 76/12 370/328 |
| 2011/0286410 | A1* | 11/2011 | Zembutsu ......... H04W 36/00 370/329 |
| 2012/0084449 | A1 | 4/2012 | Delos Reyes et al. |
| 2013/0100815 | A1 | 4/2013 | Kadadia et al. |
| 2013/0148594 | A1* | 6/2013 | Nishida ............ H04W 76/10 370/329 |
| 2013/0322311 | A1 | 12/2013 | Weniger et al. |
| 2014/0169330 | A1* | 6/2014 | Rommer ........... H04W 36/08 370/331 |
| 2015/0208291 | A1 | 7/2015 | Lee et al. |
| 2015/0256349 | A1 | 9/2015 | Kim et al. |
| 2015/0312806 | A1 | 10/2015 | Perras et al. |

OTHER PUBLICATIONS

3rd Generation Partnership Project 2 "3GPP2," Interoperability Specification (IOS) for cdma2000 Access Network Interfaces—Part 2 Transport (3G-IOS v5.1.4), Mar. 2014, 78 pages.

3rd Generation Partnership Project 2 "3GPP2," Interoperability Specification (IOS) for cdma2000 Access Network Interfaces—Part 3 Features (3G-IOS v5.0.4), Mar. 2014, 386 pages.

Network Working Group, "IP Mobility Support for IPv4," C. Perkins, Ed., Nokia Research Center, Aug. 2002, https://www.ietf.org/rfc/rfc3344.txt, 91 pages.

ETSI TS 129 275 V11.9.0, Technical Specification, Universal Mobile Telecommunications System (UMTS); LTE; Prox Mobile IPv6 (PMIPv6) based Mobility and Tunnelling protocols; Stage 3 (3GPP TS 29.275 version 11.9.0 Release 11), Mar. 2014, 88 pages.

3rd Generation Partnership Project 2 "3GPP2," "cdma2000 Wireless IP Network Standard: Simple IP and Mobile IP Access Services," 3GPP2 X.S0011-002-E, Version 1, Nov. 2009, 116 pages.

3rd Generation Partnership Project 2 "3GPP2," "Network PMIP Support Revision A," 3GGP2 X.50054-220-A, Version 1.0, Aug. 29, 2008, 50 pages.

"(LTE) Attach and Default Bearer Setup," www.eventhelix.com/lte/attach/lte-attach.pdf, Dec. 11, 2012, 6 pages.

Preinterview First Office Action dated Apr. 7, 2016, issued in connection with U.S. Appl. No. 14/520,867, filed Oct. 22, 2014, 5 pages.

Preinterview First Office Action dated Oct. 26, 2015, issued in connection with U.S. Appl. No. 14/229,432, filed Mar. 28, 2014, 5 pages.

Notice of Allowance dated Jan. 28, 2016, issued in connection with U.S. Appl. No. 14/229,432, filed Mar. 28, 2014, 8 pages.

\* cited by examiner

US 10,237,796 B1

PACKET GATEWAY REASSIGNMENT

CROSS-REFERENCE TO RELATED APPLICATION

This application is a continuation of and claims priority to U.S. patent application Ser. No. 15/062,915, filed Mar. 7, 2016, which is hereby incorporated by reference in its entirety.

BACKGROUND

Wireless networks provide packet-based services to wireless communication devices (WCDs). For example, a radio access network (RAN) may define one or more wireless coverage areas through which the WCDs may establish bearer sessions. Using such a bearer session, a particular WCD may communicate via one or more of the RAN's base stations, serving gateway (SGW) devices, and packet gateway (PGW) devices. In most cases, the WCD's network connectivity is anchored at a particular PGW device for the lifetime of the WCD's bearer session.

OVERVIEW

In some situations, a WCD may become unsynchronized with its serving RAN, at least with respect to whether the WCD has any bearer sessions with the RAN. For instance, the RAN may contain one or more contexts at various RAN devices (such as mobility management entity (MME) devices, SGW devices and/or PGW devices) indicating that the WCD has a bearer session with the RAN, but the WCD may have no record of such a bearer session. Thus, when the WCD next communicates with the RAN, it may attempt to establish a new bearer session. The RAN might determine instead to inform the WCD of the existing bearer session(s), so that the WCD maintains its contexts at the various RAN devices. Particularly, the RAN may seek to assign the WCD to the same PGW device, so that the WCD can use the same Internet Protocol (IP) address that it was previously assigned.

Nonetheless, in some cases it may be advantageous for the RAN to assign the WCD to a different PGW device, and instead establish a new bearer session, for the WCD, to that PGW device. For instance, if the RAN is attempting to balance load between multiple PGW devices, assigning the WCD to a different PGW device may allow the RAN to relieve overloaded PGW devices. Still, it is desirable for the RAN to maintain at least some of the WCD's context as the WCD is switched from the old PGW device to a new PGW device. For instance, if the WCD's assigned IP address can be maintained throughout this transition, there is less of a likelihood that the WCD's sessions with other network entities (e.g., web servers, media streaming servers, gaming servers, etc.) will be disrupted. Thus, as part of establishing a bearer session with the new PGW device, the new PGW device may retrieve the WCD's context from the old PGW device.

Accordingly, a first example embodiment may involve receiving an attach request related to a WCD. It may be determined that the WCD already has an established bearer session with a first PGW device of the RAN. Possibly in response to receiving the attach request from the WCD and the WCD already having the established bearer session with the first PGW device, a request for PGW device assignment may be transmitted to a server device. A response from the server device may be received, where the response may indicate assignment of a second PGW device of the RAN. A create session request may be transmitted to a serving gateway SGW device of the RAN. Reception of the create session request may cause the SGW device to establish, for the WCD, a new bearer session to the second PGW device. Establishment of the new bearer session may involve the second PGW device retrieving, from the first PGW device, context information related to the WCD.

A second example embodiment may include a non-transitory, computer-readable storage medium, having stored thereon program instructions that, upon execution by a computing device, cause the computing device to perform operations in accordance with the first example embodiment.

A third example embodiment may include a computing device containing a processor and data storage. The data storage may include program instructions that, when executed by the processor, cause the computing device to perform operations in accordance with the first example embodiment.

A fourth example embodiment may include means for carrying out operations in accordance with the first example embodiment.

These and other aspects and advantages will become apparent to those of ordinary skill in the art by reading the following detailed description, with reference where appropriate to the accompanying drawings. Further, it should be understood that this overview and other description throughout this document is merely for purposes of example and is not intended to limit the scope of the invention as claimed.

DETAILED DESCRIPTION

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purpose of clarity. Thus, such enumeration should not be interpreted to require or imply that these elements, blocks, or steps adhere to a particular arrangement or are carried out in a particular order.

1. EXAMPLE WIRELESS COMMUNICATION SYSTEM

Figure 1:
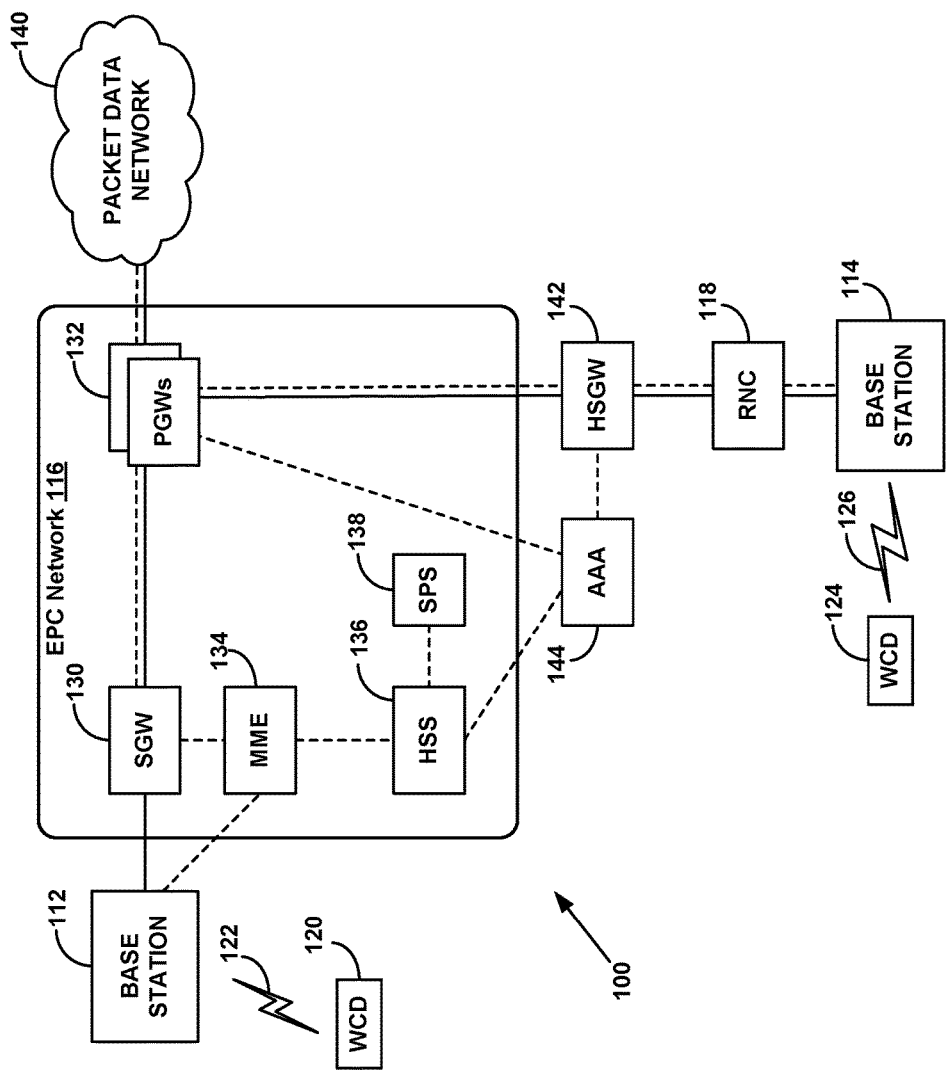
FIG. 1 is a block diagram of a wireless communication system, in accordance with an example embodiment.

FIG. 1 illustrates an example wireless communication system 100, which may be related to aspects of the present disclosure. In this example, wireless communication system 100 includes two different types of base stations, exemplified by base station 112 and base station 114. Base station 112 (e.g., an eNodeB) is part of an evolved RAN that uses an Evolved Packet Core (EPC) network 116. Base station 114 is part of a legacy RAN that includes a radio network controller (RNC) 118. Base stations 112 and 114 each provide one or more respective wireless coverage areas through which the respective base station can communicate with one or more WCDs. The wireless coverage areas provided by base stations 112 and 114 could be either overlapping or non-overlapping.

The WCDs could be wireless telephones, wirelessly-equipped handheld, tablet, or laptop computers, or any other type of WCD. Some WCDs may be referred to as user equipment (UE). Despite this nomenclature, a WCD need not be an end-user device, and may include various types of devices that have limited interactions with human users, such as server devices, remote telemetry devices, machine-to-machine devices, and/or autonomous devices.

In FIG. 1, connections that carry bearer traffic are indicated by solid lines, connections that carry signaling traffic are indicated by dashed lines, and connections that carry both bearer traffic and signaling traffic are indicated by solid lines in combination with dashed lines. However, both bearer and signaling traffic may be communicated using interfaces and/or paths not explicitly marked as such in FIG. 1.

As shown, base station 112 is in wireless communication with WCD 120 via an air interface 122, and base station 114 is in wireless communication with WCD 124 via an air interface 126. Each of air interfaces 122 and 126 may include forward direction channels for communication from the RAN to WCDs, and reverse direction channels for communication from the WCDs to the RAN.

Base stations 112 and 114 may communicate with WCDs using different air interface protocols. In one example, base station 112 communicates with WCDs, such as WCD 120, using a Long Term Evolution (LTE) protocol, whereas base station 114 communicates with WCDs, such as WCD 124, using a High Rate Packet Data (HRPD) protocol, such as Evolution Data-Only (EVDO). These air interface protocols, however, are given merely as illustrative examples. In general, base stations 112 and 114 may communicate using any air interface protocol that is known currently or may be developed.

As shown in FIG. 1, EPC network 116 includes an SGW device 130, one or more PGW devices 132, an MME device 134, a home subscriber server (HSS) device 136, and a subscriber profile store (SPS) device 138. PGW device(s) 132 may provide connectivity to a packet data network 140. SGW device 130 may support the exchange of IP bearer traffic between base station 112 and PGW device(s) 132. MME device 134 may manage signaling traffic between base station 112 and various elements in EPC network 116. This signaling traffic, for example, may be related to authentication of WCDs and activating and de-activating bearer connections for WCDs. HSS device 136 may be configured to authenticate WCDs, as well as access subscriber profiles stored in SPS device 138. For example, SPS device 138 may store subscriber profiles for WCDs that are authorized to use EPC network 116.

EPC network 116 may include other physical or logical components not shown in FIG. 1. For instance, a domain name system (DNS) server device may be present. MME device 134 may access this DNS server device in order to obtain assignments of SGW devices and/or PGW devices for WCDs. EPC network 116 may also include a policy and charging rules function (PCRF) device that interacts with a PGW device to determine any relevant policy information for a bearer session, and to assign an IP address to a WCD.

Regardless of its constituent components, EPC network 116 can provide packet data connections to packet data network 140 for WCDs served by base stations in an evolved RAN, for example, WCD 120 served by base station 112. The packet data connections that EPC network 116 provides to WCDs may, in turn, be used for web access, email, text, voice-over-IP (VoIP), video, streaming media, gaming, and/or other packet data services.

For instance, a WCD subscribed to EPC network 116 may be assigned PGW device 132 for bearer traffic communication with packet data network 140. Thus, the bearer path for this WCD may include base station 112, SGW device 130, and PGW device 132. In some embodiments, this bearer path may be facilitated by tunnels (e.g., IP-in-IP tunnels or tunnels using some other form of encapsulation) between the various devices in the bearer path. Each of these tunnels may be individually established and/or torn down.

In addition, EPC network 116 may provide packet data connections for WCDs served by other RANs, such as WCDs served by legacy RANs. In the example shown in FIG. 1, wireless communication system 100 includes an HRPD serving gateway (HSGW) device 142 that supports interworking with a legacy RAN, exemplified in FIG. 1 by base station 114 and RNC and 118. This interworking may involve (i) HSGW device 142 communicating with an authentication, authorization, and accounting (AAA) server device 144, which, in turn, may communicate with HSS device 136, and (ii) HSGW device 142 communicating with PGW device(s) 132.

For example, WCD 124, when served by base station 114, may transmit a data-connection request that relates to establishing a packet data connection. HSGW device 142 may receive the data-connection request via base station 114 and RNC device 118, and, in response, communicate with AAA device 144 to authenticate WCD 124. As part of the authentication process, AAA device 144 may perform various functions, such as communicating with HSS device 136, issuing an authentication challenge to WCD 124, evaluating a response from WCD 124 to the authentication challenge, and indicating to HSGW device 142 whether the authentication process is successful or unsuccessful. If the authentication process is successful, HSGW device 142 may communicate with PGW device(s) 132 to request a packet data connection to packet data network 140 for WCD 124. In response to the request from HSGW device 142, a selected one of PGW device(s) 132 may communicate with AAA device 144 to authenticate WCD 124 in another authentication process. If that authentication process is successful, the selected PGW device 132 may establish the packet data connection, which then enables WCD 124 to communicate with packet data network 140 via air interface 126, base station 114, RNC device 118, HSGW device 142, and the selected PGW device 132.

A "bearer session" may refer to a series of tunnels, or any other mechanism, that routes traffic to and from a WCD and its assigned PGW for a particular type of service. In some cases, a bearer session may be referred to as a packet data network (PDN) session. For instance, a WCD may be allocated a general bearer session, which may be a best effort session with a quality of service class indicator (QCI) of 9. Alternatively or additionally, the WCD may be assigned a signaling bearer session with a QCI of 5, which later could be supplemented a voice-over-LTE (VoLTE) bearer session with a QCI if 1.

In order to support a bearer session, each device in the WCD's bearer path or signaling path (e.g., base station 112, SGW device 130, one of the PGW devices(s) 132, and MME device 134) may maintain some extent of stored context for the bearer session. For example, an assigned PGW device may store the WCD's identity, assigned IP address, a network mask associated with this IP address, a next-hop gateway, a domain name system (DNS) server address, and so on. On the other hand, an MME device context may include the WCD's identity, as well as the WCD's assigned base station, SGW device, and PGW device. Contexts stored by various devices may include more or less information.

In general, the depictions of FIG. 1 are illustrative. Therefore, in a RAN, there could be more or fewer of each element than is shown, and some elements may be omitted altogether. Additionally, other types of elements not shown may be present. Further, any of these elements may be combined with one another, physically or logically, or distributed across multiple physical devices. Thus, the particular arrangement shown in FIG. 1 should not be viewed as limiting with respect to the present invention. As a non-limiting example, HSS device 136 and SPS device 138 could be combined into a single logical device.

The arrangement of wireless communication system 100 and the processes described herein are set forth herein for purposes of example only. Other arrangements and elements (e.g., machines, interfaces, functions, orders of elements, etc.) can be added or used instead, and some elements may be omitted altogether. Further, those skilled in the art will appreciate that many of the elements described herein are entities that may be implemented as discrete components or in conjunction with other components, in any suitable combination and location, and that various disclosed operations can be implemented by any combination of hardware, firmware, and/or software, such as by one or more processors programmed to execute computer instructions for instance.

2. EXAMPLE COMPUTING DEVICE

Figure 2:
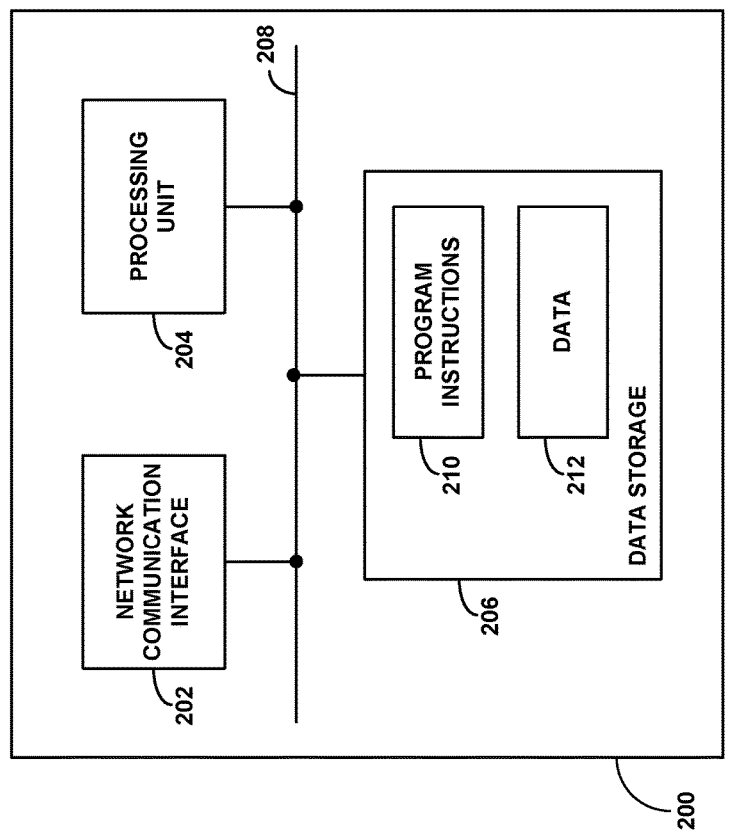
FIG. 2 is a block diagram of a computing device, in accordance with an example embodiment.

FIG. 2 is a block diagram of an example computing device 200. Computing device 200 could be a standalone general purpose or specialized computing device. Alternatively, computing device 200 could represent a WCD or a part of the RAN. Thus, computing device 200 may define hardware that supports operations of a base station, MME device, SGW device, PGW device, HSS device, or some other type of RAN component or computer.

As shown, computing device 200 includes a network communication interface 202, a processing unit 204, and data storage 206, all of which may be communicatively linked together by a system bus, network, or other connection mechanism 208. Computing device 200 may also include additional components, functions and/or interfaces not shown in FIG. 2, such as a keyboard, a mouse, a touch screen, a monitor, a printer, and/or one or more ports that interface with such devices, for example a universal serial bus (USB) or high-definition multimedia interface (HDMI) port.

Network communication interface 202 may support communication with various other network entities, such as any of the network entities shown in FIG. 1. As such, interface 202 may include one or more network interface modules, such as Ethernet, Wifi, BLUETOOTH®, and/or wide-area wireless connection network interface modules, or any other type of wired and/or wireless communication interfaces.

Processing unit 204 may comprise one or more general purpose processors (e.g., microprocessors) and/or one or more special purpose processors (e.g., application specific integrated circuits, digital signal processors, and/or network processors). Data storage 206 may comprise one or more volatile and/or non-volatile non-transitory storage components, such as optical, magnetic, or flash storage, and may be integrated in whole or in part with processing unit 204.

As shown, data storage 206 may hold program instructions 210 and data 212. Program instructions 210 may be executable by processing unit 204 to carry out various functions described herein and/or depicted in the accompanying drawings. Data 212 could be any data that is generated, received, stored, or used in connection with carrying out such functions.

3. EXAMPLE MESSAGE FLOWS

For purposes of illustration, this section describes examples of transactions in accordance with possible embodiments. Each of FIGS. 3, 4, and 5 may involve, directly or indirectly, WCD 300, base station 302, MME device 304, SGW device 306, DNS server device 308, PGW device 310, and/or PGW device 312. Additionally, throughout FIGS. 3, 4, and 5, various messages may be referred to with various labels, such as "connection request, "attach request," "authentication request," and so on. In some implementations, messages that perform the substantive operations described herein may be given different labels, or may be referred to differently. Further, the operations of some messages shown in these figures may be performed by more or fewer messages. Moreover, for purposes of simplicity, these figures may omit some network components and/or messages that may be present in particular embodiments.

Figure 3:
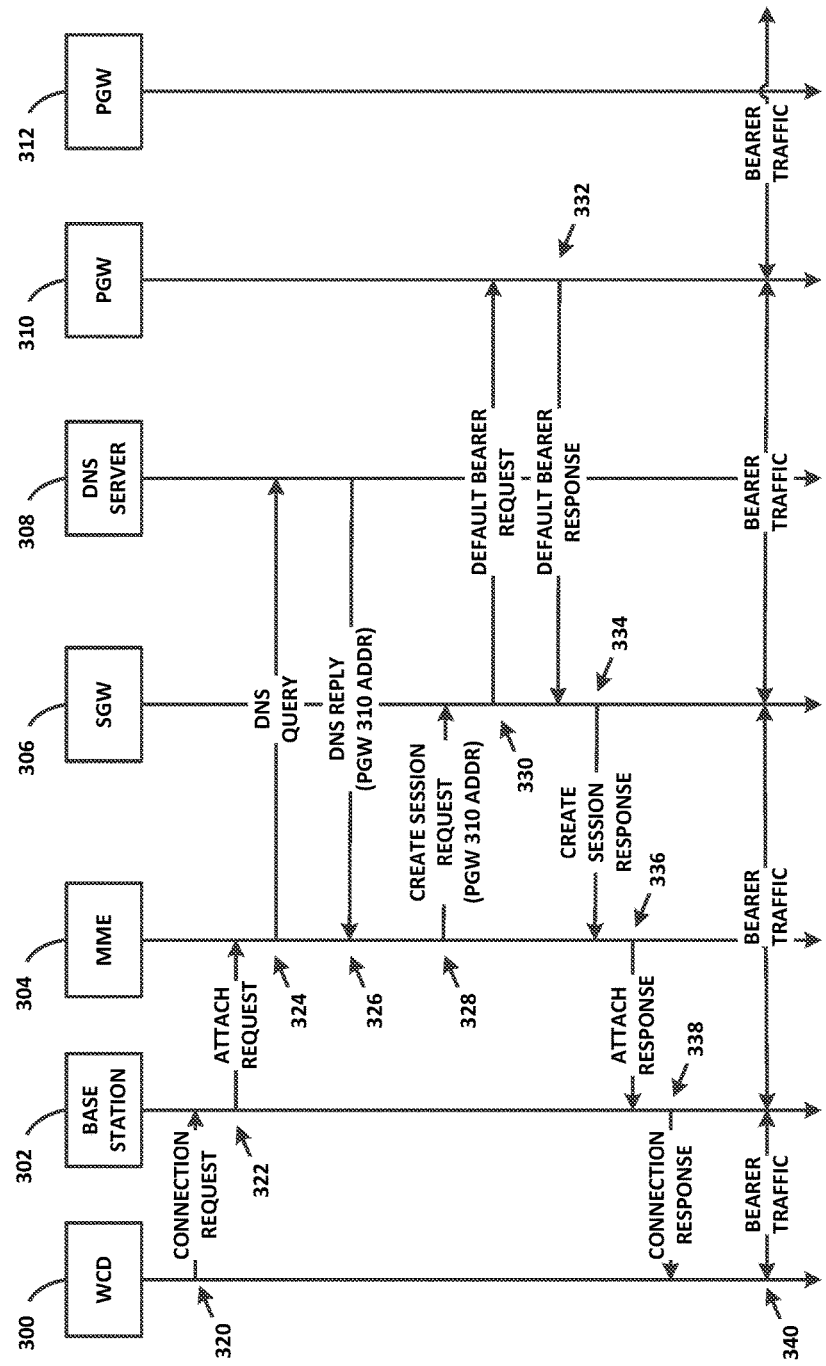
FIG. 3 is a message flow diagram, in accordance with an example embodiment.

FIG. 3 illustrates one possible way in which WCD 300 can establish a bearer session with PGW device 310. At step 320, WCD 300 may transmit a connection request to base station 302. At step 322, base station 302, in turn, may transmit an attach request to MME device 304.

MME device 304 may examine an identifier of WCD 300 provided in the connection request, such as a network access identifier (NAI), international mobile subscriber identifier (IMSI), mobile equipment identifier (MEID), or some other type of device or user identifier. Based on this identifier, MME device 304 may determine that WCD 300 subscribes to the wireless service provider that operates the devices shown in FIG. 3. For instance, MME device 304 may request authentication of WCD 300 by an HSS device of this wireless service provider.

While not shown, such an authentication transaction may involve MME device 304 transmitting an authentication request to the HSS device. This authentication request may seek to determine whether WCD 300 has a valid subscription with the wireless service provider, and/or whether the wireless service provider will permit WCD 300 to use the services of the wireless service provider. The HSS device may look up the NAI, IMSI, MEID, or other identifier of WCD 300 in a local or remote subscriber database to make this determination. If WCD 300 has a valid subscription and is permitted to use the services of the wireless service provider, the HSS device may transmit an authentication response indicating such to MME device 304.

At step 324, MME device 304 may transmit a DNS query to DNS server device 308. This query may include a domain name associated with one or more PGW devices of the wireless service provider. In response to receiving the query, DNS server device 308 may look up the domain name in a database that maps PGW device domain names to PGW device IP addresses. In some cases, DNS server device 308 may seek to select a PGW device such that the load across two or more PGW devices is balanced.

PGW device load balancing can be achieved in a number of ways. For example, DNS server device 308 may receive, periodically or from time to time, load reports from PGW device 310 and PGW device 312. These load reports may include representations of one or more of the number of WCDs assigned to each PGW device, the number of bearer sessions supported by each PGW device, the WCD traffic bitrate being transmitted and/or received by each PGW device, and so on. DNS server device 308 may use one or more of these representations to select a PGW device.

For instance, DNS server device 308 may calculate respective weighted averages of the number of bearer sessions supported and the WCD traffic bitrate for each PGW device, and use these weighted averages as the "load" on the PGW devices. Then, DNS server device 308 may select the PGW device with the lowest load. In some cases, DNS server device 308 may include randomness in the selection process, such as randomly choosing a PGW device from all PGW devices with loads that are lower than a predetermined threshold load (e.g., 25%, 50%).

Regardless, the load balancing described herein does not explicitly seek to perfectly balance load across PGW devices. Instead, DNS server device 308 may distribute WCDs to PGW devices such that the load across the PGW devices is likely to be balanced, or at least such that it is unlikely that a small number of PGW devices will exhibit a significantly higher load than other PGW devices.

At step 326, after a PGW device is selected, DNS server device 308 may transmit a DNS reply to MME device 304. This reply may contain the IP address of the selected PGW device—in this case, PGW device 310.

At step 328, MME device 304 may transmit a create session request to SGW device 306. The create session request may also include the IP address of PGW device 310. Possibly among other functions, the create session request may instruct SGW device 306 to create a portion of a bearer path (e.g., a tunnel) from itself to PGW device 310.

Accordingly, at step 330, SGW device 306 may transmit a default bearer request to PGW device 310, and PGW device 310 may respond, at step 332, by transmitting a default bearer response to SGW device 306. Additional portions of the bearer path may be established at steps 334, 336, and 338 by SGW device 306 transmitting a create session response to MME device 304, MME device 304 transmitting an attach response to base station 302, and/or base station 302 transmitting a connection response to WCD 300, respectively.

At step 340, a bearer path has been established for WCD 300, possibly involving WCD 300, base station 302, SGW device 306, and PGW device 310. MME device 304 might perform only signaling functions, and therefore might not be part of this path. Via the bearer path, WCD 300 may communicate with correspondent nodes on a public network (e.g., the Internet) or other devices and/or services within the wireless service provider's network.

As noted previously, in some situations, WCD 300 may be configured to attempt to establish one or more new bearer sessions with the RAN even though the RAN contains context for one or more existing bearer sessions for the WCD. For instance, WCD may have lost air interface connectivity with the RAN for a few seconds (e.g., 1-5 seconds or less). The WCD may be configured to, upon re-acquiring air interface connectivity, attempt to establish the new bearer session(s). However, the RAN may maintain its contexts for the WCD's existing bearer sessions during this period of time—in fact, the RAN may be unaware that the WCD lost air interface connectivity.

Given that WCD 300 and the RAN are out of synchronization in such a scenario, it may be advantageous for the RAN to consider assigning WCD 300 to a new PGW device. Doing so with the DNS load balancing technique described above would result in an assignment of WCD 300 to a new PGW device if the load on PGW device 310 had grown higher than other PGW devices. When a new PGW device is assigned in this manner, MME device 304 may provide the new PGW device with the IP address of the old PGW device so that the new PGW device can retrieve the context of WCD 300 from the old PGW device. In this way, WCD 300 can be assigned the same IP address on the new bearer session so that communication sessions between WCD 300 and various other devices (e.g., web servers, video streaming servers, voice-over-IP servers, gaming servers, and so on) can be maintained.

Figure 4:
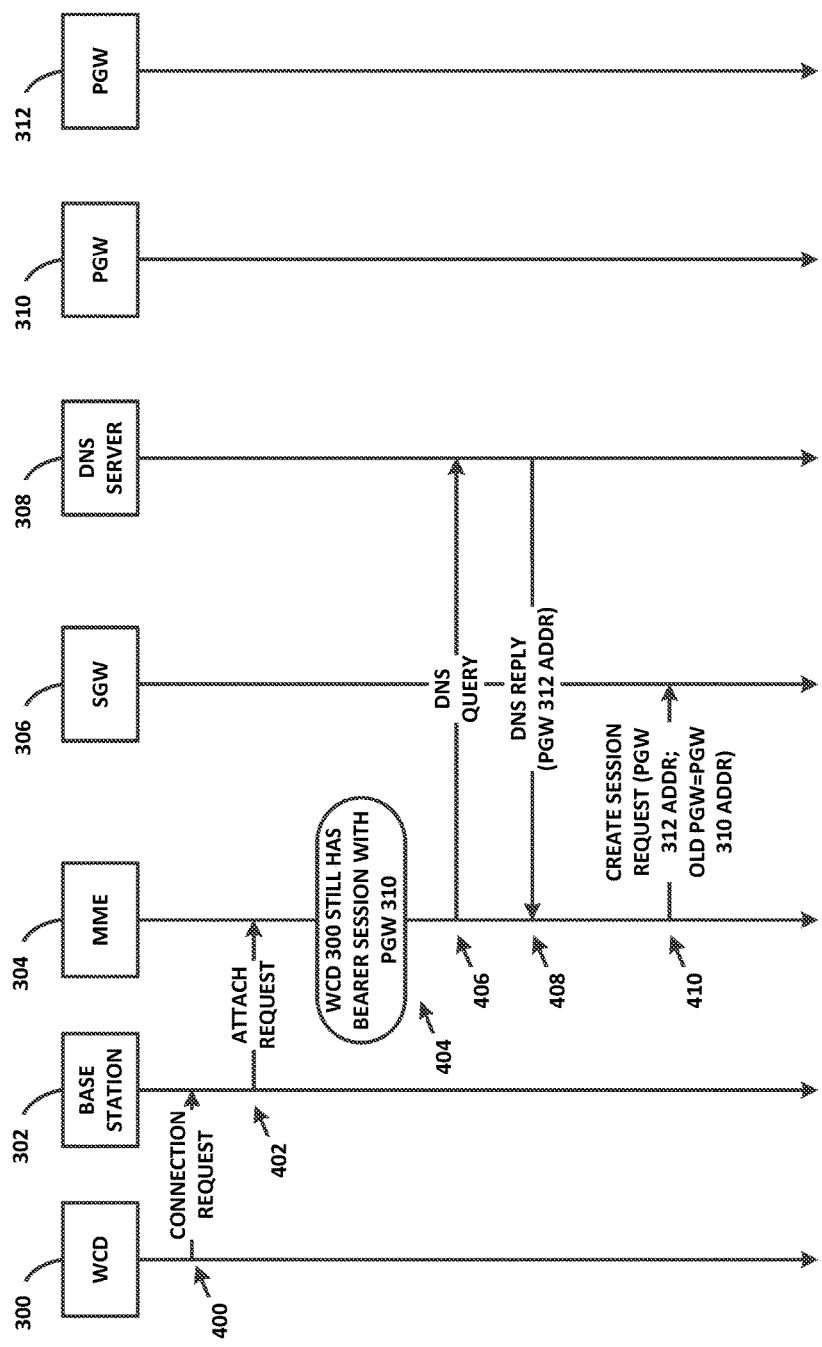
FIG. 4 is a message flow diagram, in accordance with an example embodiment.
Figure 5:
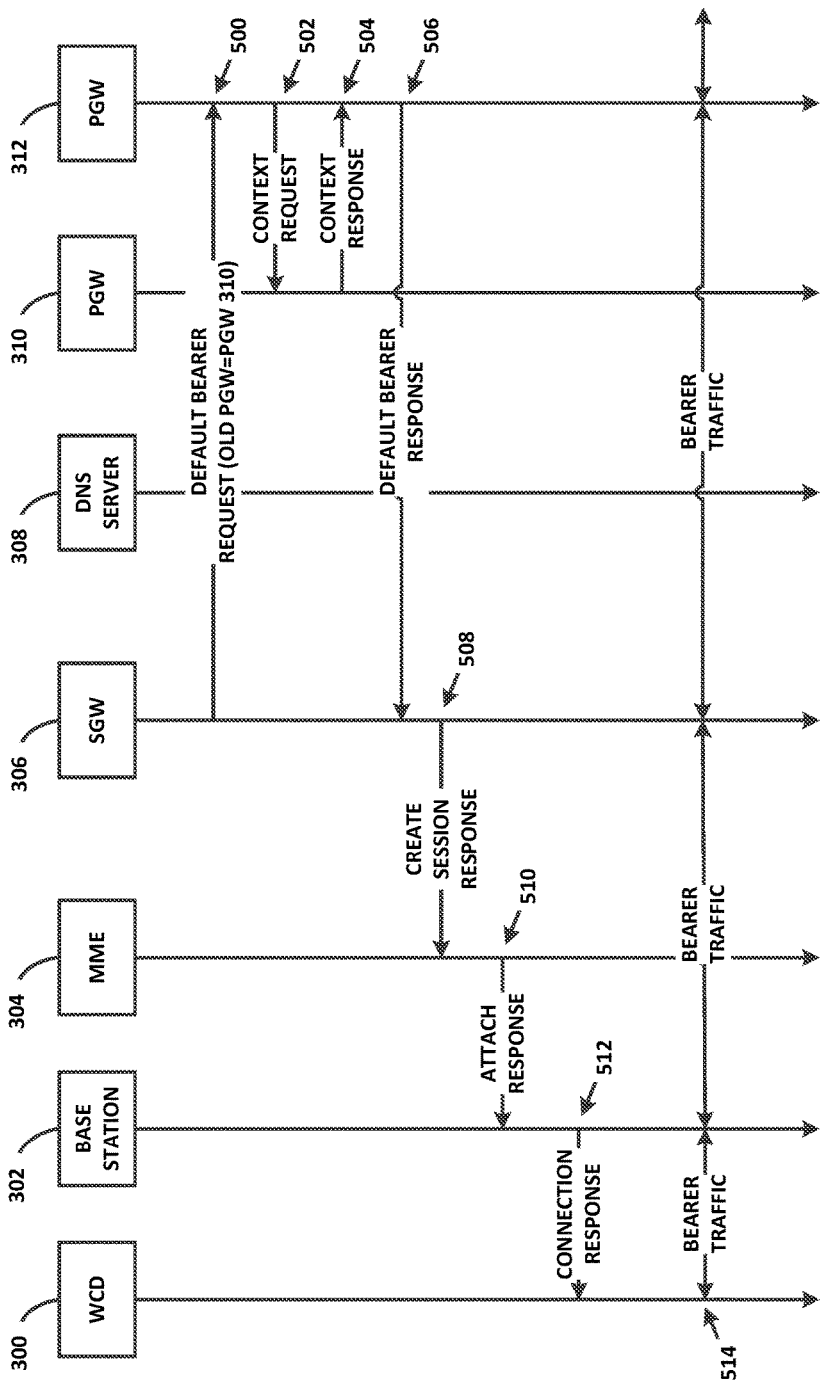
FIG. 5 is a message flow diagram, in accordance with an example embodiment.

FIGS. 4 and 5 continue the scenario of FIG. 3, and illustrate WCD 300 attempting to establish a new bearer session with the RAN, and being assigned to a new PGW device. At step 400 of FIG. 4, WCD 300 may transmit a connection request to base station 302.

At step 402, base station 302 may transmit an attach request to MME device 304. This attach request may be an initial attach request, or at least indicate that WCD 300 is attempting to establish a new bearer session. At step 404, possibly in response to receiving the attach request, MME device 304 may determine that a bearer session context exists for WCD 300. For instance, MME device 304 may locally store or otherwise have access to context information related to a bearer session involving WCD 300, SGW device 306, PGW device 310, and/or other devices in the RAN.

At step 406, possibly in response to one or both of (i) receiving the attach request, and (ii) the bearer session existing, MME device 304 may transmit a DNS query to DNS server device 308. Not unlike step 324, this query may include a domain name associated with one or more PGW devices of the wireless service provider. In response to receiving the query, DNS server device 308 may look up the domain name in the database that maps PGW device domain names to PGW device IP addresses. In this case, possibly as a result of the load balancing mechanisms described above, DNS server device 308 assigns PGW device 312 to anchor a new bearer session.

Thus, at step 408, DNS server device 308 may transmit a DNS reply to MME device 304 containing the IP address of PGW device 312. At step 410, MME device 304 may transmit a create session request to SGW device 306. This create session request may include the IP address of PGW device 312, the new PGW device, as well as the IP address of PGW device 310, the old PGW device.

Turning to FIG. 5, at step 500, SGW device 306 may transmit a default bearer request to PGW device 312. This default bearer request may also include the IP address of PGW device 310. At step 502, possibly in response to receiving the default bearer request, PGW device 312 may transmit a context request to PGW device 310. The context request may include an identifier of WCD 300, and may instruct PGW device 310 to transfer the context of WCD 300 to PGW device 312. Accordingly, at step 504, PGW device 310 may transmit a context response, including the context of WCD 300, to PGW device 312. At step 506, PGW device 312 may transmit a default bearer response to SGW device 306. In some cases, steps 502 and 504 may take place after step 506.

Additional portions of the new bearer path may be established at steps 508, 510, and 512 by SGW device 306 transmitting a create session response to MME device 304, MME device 304 transmitting an attach response to base station 302, and/or base station 302 transmitting a connection response to WCD 300, respectively.

At step 514, a bearer path has been established for WCD 300, possibly involving WCD 300, base station 302, SGW device 306, and PGW device 312. Via the new bearer path, WCD 300 may communicate with correspondent nodes on a public network (e.g., the Internet) or other devices and/or services within the wireless service provider's network.

At some point after step 502, PGW device 310 may tear down the old bearer session. This may involve PGW device 310 deleting its stored context for WCD 300, and transmitting an indication to SGW device 306 that the old bearer session has been terminated. Further, SGW device 306, possibly through messaging with MME device 304 and/or base station 302, may cause the tear down of other legs of the old bearer session's bearer path, as well as the deletion of any associated context stored by these devices.

4. EXAMPLE OPERATIONS

Figure 6:
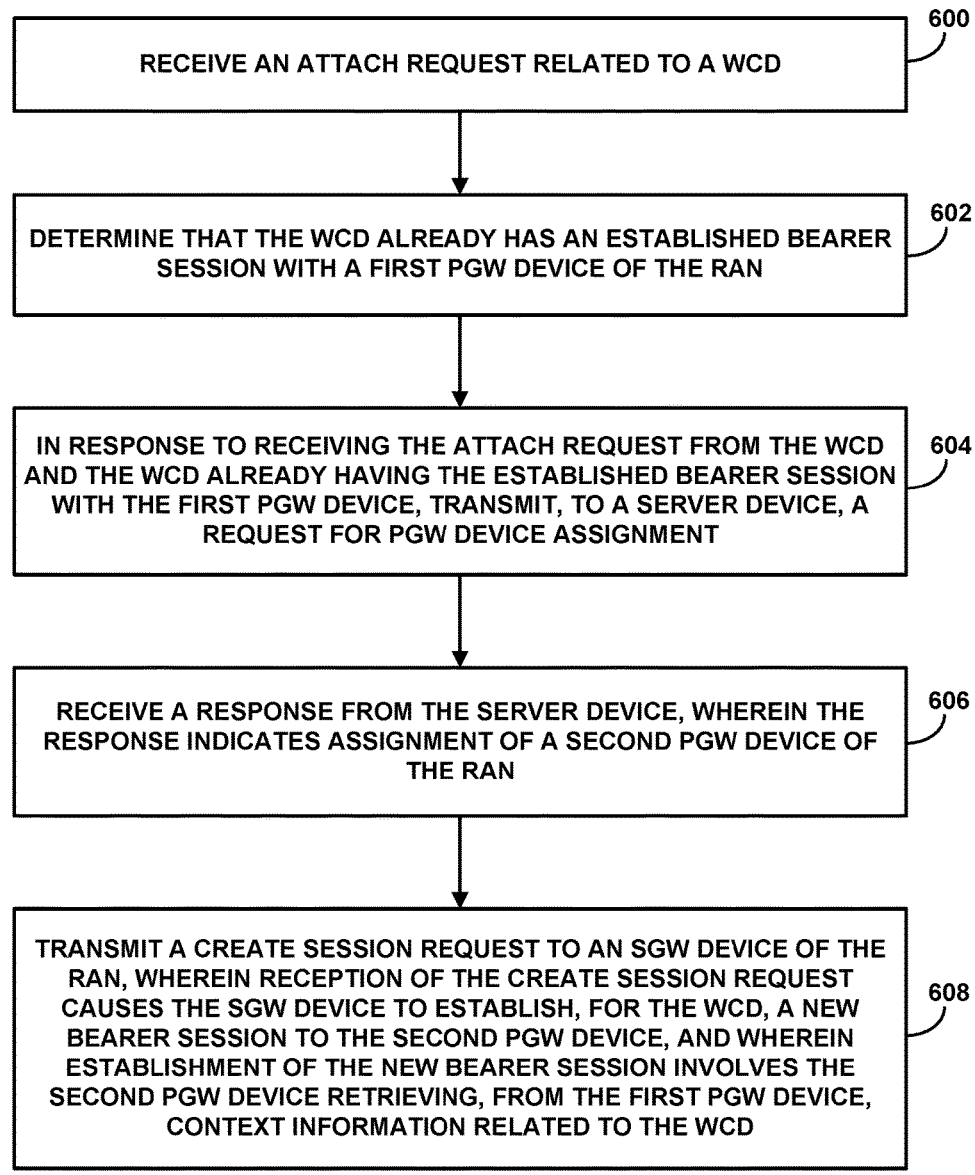
FIG. 6 is a flow chart, in accordance with an example embodiment.

FIG. 6 is flow chart in accordance with example embodiments. The operations illustrated by this flow chart may be carried out by a computing device, such as computing device 200. In some embodiments, computing device 200 may represent a RAN device, such as an MME device.

Block 600 of FIG. 6 involves receiving, by an MME device of a RAN, an attach request related to a WCD. This attach request may be an initial attach request containing a request for bearer session establishment for the WCD. In some cases, the attach request is received after the WCD has lost connectivity with the RAN for at least a pre-defined period of time.

For instance, the WCD may lose air interface connectivity with the RAN for a few seconds (e.g., 1-5 seconds or less). The WCD may be configured to, upon re-acquiring air interface connectivity, attempt to establish one or more new bearer sessions. However, the RAN may maintain its contexts for the WCD's existing bearer sessions during this period of time. Further, the WCD may be disconnected from the air interface for a longer period of time.

Block 602 may involve determining, by the MME device, that the WCD already has an established bearer session with a first PGW device of the RAN. Determining that the WCD already has an established bearer session with the first PGW device may involve determining that the MME device has a stored context for the WCD that indicates that the established bearer session exists. This stored context may include the IP address of the first PGW device among other information.

Block 604 may involve, in response to receiving the attach request from the WCD and the WCD already having the established bearer session with the first PGW device, transmitting, by the MME device to a server device, a request for PGW device assignment. The server device may be a DNS server device. Thus, transmitting the request for PGW assignment may involve transmitting a DNS query, and receiving the response indicating assignment of the second PGW device may involve receiving a DNS response containing an IP address of the second PGW device. Further, the DNS server device may assign PGW devices such that load on PGW devices in the RAN is balanced. Any of the load balancing techniques described herein, or other techniques, may be used.

Block 606 may involve receiving, by the MME device, a response from the server device. The response may indicate assignment of a second PGW device of the RAN.

Block 608 may involve transmitting, by the MME device, a create session request to an SGW device of the RAN. Reception of the create session request may cause the SGW device to establish, for the WCD, a new bearer session to the second PGW device. Establishment of the new bearer session may involve the second PGW device retrieving, from the first PGW device, context information related to the WCD. The context information related to the WCD may include an IP address assigned to the WCD.

In some embodiments, after establishment of the new bearer session with the second PGW device, the established bearer session with the first PGW device may be torn down. In other embodiments, the established bearer session may be allowed to time out.

Transmitting the create session request to the SGW device may involve transmitting an IP address of the first PGW device to the SGW device. Establishment of the new bearer session may involve the SGW device transmitting the IP address of the first PGW device to the second PGW device. Additionally, the second PGW device retrieving context information related to the WCD may involve the second PGW device using the IP address of the first PGW device to retrieve the context information.

It should be understood that the embodiments depicted in FIG. 6 and discussed in the context of FIG. 6 are merely examples, and that other embodiments may be possible. For instance, the features associated with any of FIGS. 3, 4, and/or 5, may be combined with the embodiment of FIG. 6.

5. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages can be executed out of order from that shown or discussed, including substantially concurrent or in reverse order, depending on the functionality involved. Further, more or fewer blocks and/or functions can be used with any of the ladder diagrams, scenarios, and flow charts discussed herein, and these ladder diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
   receiving, by a serving gateway (SGW) device of a radio access network (RAN), a create session request related to a wireless communication device (WCD), wherein the create session request includes an Internet Protocol (IP) address of a first packet gateway (PGW) device, and wherein the WCD has an established bearer session with the first PGW device;
   transmitting, by the SGW device, a message including the IP address of the first PGW device to a second PGW device, wherein reception of the message causes the second PGW device to use the IP address of the first PGW device when retrieving, from the first PGW device, context information related to the established bearer session, wherein the context information includes an IP address assigned to the WCD; and
   establishing, by the SGW device, a new bearer session involving the WCD, the SGW device, and the second PGW device, wherein the new bearer session maintains assignment of the IP address assigned to the WCD.

2. The method of claim 1, wherein the create session request also includes an IP address of the second PGW device.

3. The method of claim 2, wherein presence of the IP address of the second PGW device in the create session request causes the SGW device to transmit the message to the second PGW device.

4. The method of claim 2, wherein the create session request includes the IP address of the second PGW device based on load balancing operations performed by a domain name system (DNS) server of the RAN.

5. The method of claim 1, further comprising:
   after establishing the new bearer session, tearing down the established bearer session.

6. The method of claim 1, wherein reception of the create session request message occurs after the WCD has lost connectivity with the RAN for at least a pre-defined period of time.

7. The method of claim 1, wherein the message is a default bearer request.

8. The method of claim 7, wherein the SGW device receives the create session request from a mobility management entity (MME) device of the RAN, and wherein establishing the new bearer session comprises:
   receiving, from the second PGW device, a default bearer response that is a reply to the default bearer request; and
   transmitting, to the MME device, a create session response that is a reply to the create session request.

9. A radio access network (RAN) comprising:
   a first packet gateway (PGW) device assigned a first Internet Protocol (IP) address;
   a second PGW device assigned a second IP address; and
   a serving gateway (SGW) device configured to:
   receive a create session request related to a wireless communication device (WCD), wherein the create session request includes the first IP address, and wherein the WCD has an established bearer session with the first PGW device,
   transmit a message including the first IP address to the second PGW device, wherein reception of the message causes the second PGW device to use the first IP address when retrieving, from the first PGW device, context information related to the established bearer session, wherein the context information includes a third IP address assigned to the WCD, and establish a new bearer session involving the WCD, the SGW device, and the second PGW device, wherein the new bearer session maintains assignment of the third IP address assigned to the WCD.

10. The RAN of claim 9, wherein the create session request also includes the second IP address.

11. The RAN of claim 10, wherein presence of the second IP address in the create session request causes the SGW device to transmit the message to the second PGW device.

12. The RAN of claim 10, further comprising:
a domain name system (DNS) server, wherein the create session request includes the second IP address based on load balancing operations performed by the DNS server.

13. The RAN of claim 9, wherein the SGW device is further configured to:
after establishing the new bearer session, tearing down the established bearer session.

14. An article of manufacture including a non-transitory computer-readable medium, having stored thereon program instructions that, upon execution by a serving gateway (SGW) device in a radio access network (RAN), cause the SGW device to perform operations comprising:
receiving a create session request related to a wireless communication device (WCD), wherein the create session request includes an Internet Protocol (IP) address of a first packet gateway (PGW) device, and wherein the WCD has an established bearer session with the first PGW device;
transmitting a message including the IP address of the first PGW device to a second PGW device, wherein reception of the message causes the second PGW device to use the IP address of the first PGW device when retrieving, from the first PGW device, context information related to the established bearer session, wherein the context information includes an IP address assigned to the WCD; and
establishing a new bearer session involving the WCD, the SGW device, and the second PGW device, wherein the new bearer session maintains assignment of the IP address assigned to the WCD.

15. The article of manufacture of claim 14, wherein the create session request also includes an IP address of the second PGW device.

16. The article of manufacture of claim 15, wherein presence of the IP address of the second PGW device in the create session request causes the SGW device to transmit the message to the second PGW device.

17. The article of manufacture of claim 15, wherein the create session request includes the IP address of the second PGW device based on load balancing operations performed by a domain name system (DNS) server of the RAN.

* * * * *